UNITED STATES PATENT OFFICE.

FRANK MARQUARD, OF NEWBURYPORT, MASSACHUSETTS, ASSIGNOR TO VULCANIZED WOOD COMPANY.

IMPROVED VULCANIZABLE COMPOUND TO IMITATE HORN, HARD RUBBER, &c.

Specification forming part of Letters Patent No. 85,945, dated January 19, 1869.

*To all persons to whom these presents may come:*

Be it known that I, FRANK MARQUARD, of Newburyport, in the county of Essex and State of Massachusetts, have invented a new and useful Vulcanizable Composition, to be used for various purposes in the arts; and I do hereby declare the same and its constituents, and the manner of compounding them, to be fully described as follows:

My said composition consists, first, of sawdust or comminuted wood; second, of sulphur; third, of a gummy, albuminous, or gelatinous substance, such as starch, vegetable gum, or gelatine; fourth, of a coloring-matter, such as extract of logwood and bichromate of potash, or nut-galls and sulphate of iron, for instance.

In making the said composition, I usually take forty pounds of sawdust or wood, and grind the same with ten pounds of sulphur, well washed. To this I afterward add a mixture or emulsive compound of one-quarter of a pound of extract of logwood, fifteen grains of bichromate of potash, five pounds of albumen, one quart of animal or vegetable oil, two pounds of gum-arabic, and about eight gallons of water.

The whole is to be well mixed or incorporated together, after which it should be dried at a moderate temperature. After becoming dry, the compound should be reduced to a fine powder, in which condition it may be kept ready for use for any length of time.

By exposing this composition in a mold heated to about 300° Fahrenheit, it will be melted and vulcanized.

The product is capable of taking a high polish, and will not be affected by either hot or cold water.

From this composition knife-handles, boot-heels, cane and umbrella handles, door-knobs, buttons, and various other useful articles may be manufactured by means of heated molds of the proper forms.

Another mode of making the composition, which I have contemplated and employed, may be thus described: Take sixteen pounds of sawdust or ground wood, moistened with warm water, and add to it twenty-two pounds of starch, three pounds of glue, one pound of alum, twenty-six pounds of flour, one-quarter of a pound of extract of logwood, and fifteen grains of bichromate of potash, to which add water, and boil the whole until reduced to a proper consistency. When cold I add to the whole forty pounds of sawdust and two pounds of sulphur, proviously ground together.

This mass is next to be melted into sheets of any desired thickness and dried by any suitable means. In this state it can be kept ready for use.

This form of composition is will adapted for the making of picture-frames, moldings, cornices, rosettes, or ornaments for furniture, as well as for other purposes, it being reduced to the proper forms by molds, heated, as described, so as to vulcanize it.

I do not confine my invention to the precise proportions of its constituents, as specified, as such may be varied somewhat without materially changing the character of the composition.

I claim—

The said vulcanizable composition, composed of constituents and in manner substantially as described.

F. MARQUARD.

Witnesses:
   R. H. EDDY,
   SAMUEL N. PIPER.